(12) United States Patent
Mitlo et al.

(10) Patent No.: US 9,492,043 B1
(45) Date of Patent: Nov. 15, 2016

(54) AIRCRAFT RETRIEVAL

(71) Applicant: Max Torque, LLC, Houston, TX (US)

(72) Inventors: Angelo Yeshow Mitlo, Houston, TX (US); Tony Mitlo, Houston, TX (US); Frankie Frunka Mitlo, Houston, TX (US)

(73) Assignee: MAX TORQUE, LLC, Houston, TX (US)

( * ) Notice: Subject to any disclaimer, the term of this patent is extended or adjusted under 35 U.S.C. 154(b) by 3 days.

(21) Appl. No.: 14/698,233

(22) Filed: Apr. 28, 2015

(51) Int. Cl.
*B08B 3/00* (2006.01)
*A47K 17/00* (2006.01)
*B08B 3/10* (2006.01)

(52) U.S. Cl.
CPC *A47K 17/00* (2013.01); *B08B 3/10* (2013.01)

(58) Field of Classification Search
CPC ........................................................ B08B 3/00
See application file for complete search history.

(56) References Cited

U.S. PATENT DOCUMENTS

| | | | | |
|---|---|---|---|---|
| 5,205,306 A * | 4/1993 | Peterson | ............... | A47K 3/287 134/104.2 |
| 5,429,437 A * | 7/1995 | Shaw | ................... | F16N 31/006 220/9.2 |
| H001477 H * | 9/1995 | Payne | .................. | B65F 1/1426 405/129.57 |
| 5,620,018 A * | 4/1997 | Carpenter | ........... | B67D 7/3209 137/312 |
| 2004/0170526 A1* | 9/2004 | Curry | ..................... | A61L 2/088 422/28 |
| 2006/0070654 A1* | 4/2006 | VanBasten | ............... | G21F 9/22 137/15.01 |

OTHER PUBLICATIONS

The New Jersey Aircraft Accident Procedures Manual, Feb. 2009, NJ Department of Transportation.*
ICAO Cir 315, Hazards at Aircraft Accident Sites, 2008, International Civil Aviation Organization.*

* cited by examiner

*Primary Examiner* — John Kreck
(74) *Attorney, Agent, or Firm* — Adolph Locklar (57) ABSTRACT

A process for aircraft retrieval and aircraft crash site remediation may include establishing a perimeter at an aircraft crash site. The process may include containing wreckage in a containment unit that is adapted to prevent release of hazardous materials into the environment. The wreckage may include wreckage of an aircraft from the aircraft crash site. The process may include washing at least some of the wreckage in a decontamination unit. The process may include packaging the washed wreckage in a container.

25 Claims, 8 Drawing Sheets

AIRCRAFT RETRIEVAL

CROSS-REFERENCE TO RELATED APPLICATIONS

Not applicable.

TECHNICAL FIELD/FIELD OF THE DISCLOSURE

The present disclosure relates to aircraft retrieval and aircraft crash site remediation.

BACKGROUND OF THE DISCLOSURE

Wreckage at aircraft crash sites may be retrieved. Typically, aircraft crash sites are subject to investigation by governmental entities, such as the National Transportation Safety Board (NTSB). Wreckage at some aircraft crash sites may contain hazardous materials. Some hazardous materials at aircraft crash sites may be subject to regulation by governmental entities, such as the United States Environmental Protection Agency (EPA).

SUMMARY

The present disclosure provides a process. The process includes establishing a perimeter at an aircraft crash site. The process includes containing wreckage in a containment unit that is adapted to prevent release of hazardous materials into the environment. The wreckage includes wreckage of an aircraft from the aircraft crash site. The process includes washing at least some of the wreckage in a decontamination unit. The process includes packaging the washed wreckage in a container.

The present disclosure provides a process. The process includes establishing a perimeter at an aircraft crash site. The process includes locating wreckage at the aircraft crash site. The wreckage includes wreckage of an aircraft. The process includes identifying hazardous materials at the aircraft crash site. The process includes preventing contamination by the hazardous materials of the environment within or proximate to the perimeter. The process includes determining a hazardous waste profile for the identified hazardous materials or for identified potentially hazardous materials. The process includes packing, transporting, disposing of, or combinations thereof the identified hazardous materials or identified potentially hazardous materials based upon the hazardous waste profiles. The process includes washing at least some of the wreckage. The process includes determining a waste profile of washing medium that has been used to wash the wreckage and, based on the waste profile, sending the used washing medium to a transportation storage and disposal facility for disposal, an environmental landfill for disposal, or combinations thereof. The process includes packaging at least some of the washed wreckage. The process includes shipping at least some of the packaged wreckage or allowing at least some of the packaged wreckage to be shipped.

The present disclosure provides a containment unit that is adapted to contain wreckage and prevent release of hazardous materials into the environment.

The present disclosure provides a decontamination unit that is adapted for washing wreckage of an aircraft from an aircraft crash site.

The present disclosure provides a container that is adapted to contain wreckage of an aircraft from an aircraft crash site during transport.

The present disclosure provides a personnel decontamination unit adapted to allow personnel working at or proximate an aircraft crash site to decontaminate.

The present disclosure provides a system. The system includes a containment unit that is adapted to contain wreckage and prevent release of hazardous materials into the environment, a decontamination unit that is adapted for washing wreckage of the aircraft, a container that is adapted to contain the wreckage, a personnel decontamination unit that is adapted to allow personnel working at or proximate the aircraft crash site to decontaminate, or combinations thereof.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
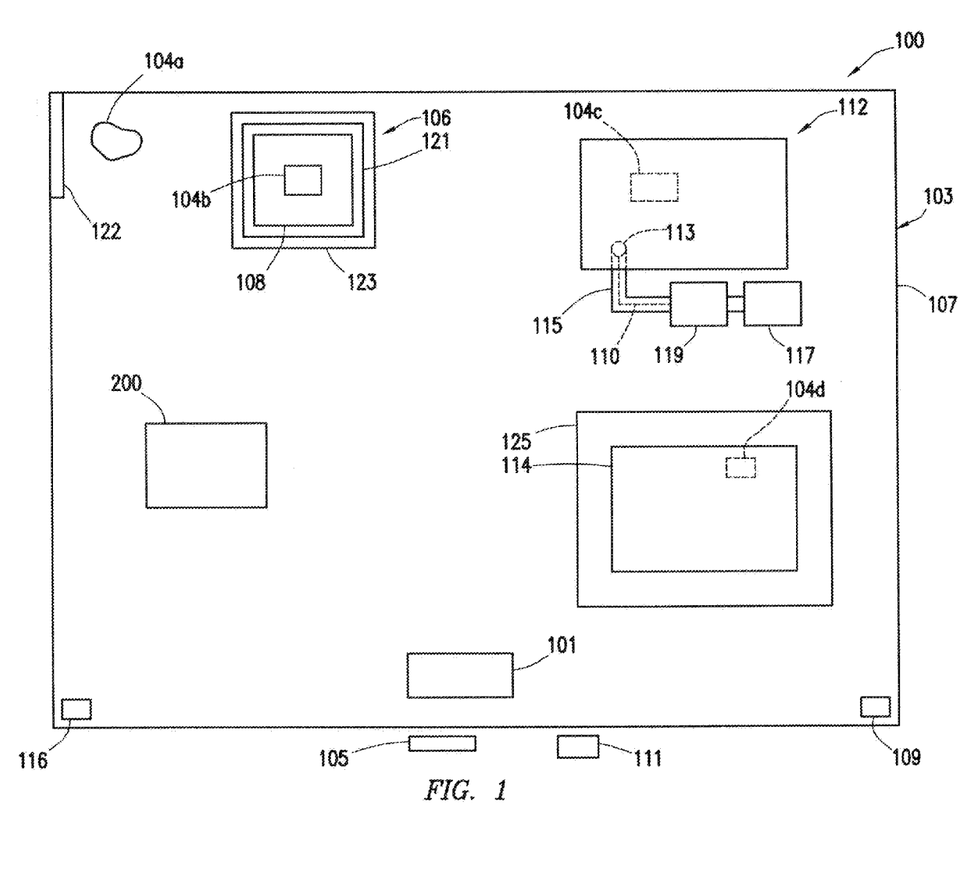
FIG. 1 depicts an aircraft crash site according to one or more embodiments.

One or more embodiments relate to a process for aircraft retrieval and aircraft crash site remediation. FIG. 1 depicts wreckage 104a-104d of an aircraft at aircraft crash site 100 according to certain embodiments. Aircraft may include manmade machines or structures adapted to fly, including manned and unmanned machines or structures. For example and without limitation, aircraft may include airplanes, helicopters, unmanned aerial vehicles (UAV), hot air balloons, or blimps.

The process may include reviewing a cargo manifest of aircraft, which may be performed prior to accessing aircraft crash site 100. Cargo manifest may be reviewed to determine the absence or presence of hazardous materials on aircraft. Hazardous materials, as used throughout this disclosure, may include materials that may be harmful to human health or the environment. For example and without limitation, hazardous materials may include various hydrocarbons, such as benzene, toluene, and xylene isomers (BTX), oil range organics (ORO), diesel range organics (DRO), gasoline range organics (GRO); heavy metals, such as Chromium; radioactive materials; or combinations thereof. Hazardous materials may include biohazards. Hazardous materials may include petroleum fuel, volatile organic compounds (VOCs), polychlorinated biphenyls, asbestos, or combinations thereof.

The process may include accessing aircraft crash site 100. For example and without limitation, a notification may be received from an entity. The notification may include a request that aircraft crash site 100 be accessed for aircraft retrieval and aircraft crash site 100 remediation. The entity providing notification may be an airline or an insurance carrier associated with aircraft, for example. Persons accessing aircraft crash site 100 may be wearing personal protective equipment (PPE), which may be in accordance with standard number 1910.120 App B set forth by the Occupations Safety and Health Administration (OSHA) of the United States Department of Labor. For example and without limitation, PPE may include a commercially available TYCHEM® Level A or B suit. Persons accessing aircraft crash site 100 may wear PPE during initial access of aircraft crash site 100 to assess the presence or lack thereof of hazardous materials at aircraft crash site 100. If hazardous materials are determined to be present at aircraft crash site 100, persons accessing aircraft crash site 100 may continue to wear PPE until hazardous materials have been removed from aircraft crash site 100.

The process may include locating an owner of land corresponding to at least a portion of aircraft crash site 100, such as land on which aircraft crash site 100 resides. The process may include obtaining permission from owner to access the land, clean the land, alter the land, or combinations thereof. For example and without limitation, one or more executed legal documents from the owner granting access to the land, granting rights to clean the land, granting rights to alter the land, or combinations thereof may be obtained.

The process may include reviewing and determining required licenses and regulatory requirements for aircraft retrieval and aircraft crash site 100 remediation. Required licenses and regulatory requirements may include local, state, and federal licenses and regulatory requirements. The process may include obtaining an EPA one time generator number associated with the address of aircraft crash site 100 for aircraft retrieval and aircraft crash site 100 remediation operations. For example and without limitation, an EPA ID number may be obtained using federal application form, EPA Form 8700-12, or through a state implementing agency.

The process may include locating wreckage 104a at aircraft crash site 100. Locating wreckage 104a may include utilizing visual inspection of aircraft crash site 100, utilizing metal detectors at aircraft crash site 100, utilizing aerial video of aircraft crash site 100, or combinations thereof. For example and without limitation, aerial video of aircraft crash site 100 may be obtained utilizing unmanned aerial video drones at aircraft crash site 100.

Wreckage 104a-104d may include one or more pieces of aircraft, one or more pieces of aircraft content, one or more pieces of aircraft crash site 100 content, or combinations thereof. For example and without limitation, aircraft content may include cargo and non-cargo items contained within aircraft at aircraft crash site 100, or contained within aircraft prior to crash of aircraft. Aircraft crash site 100 content may include one or more structures present at aircraft crash site 100 prior to crash of aircraft. For example and without limitation, aircraft crash site 100 may include manmade structures such as buildings, natural structures such as trees, or combinations thereof. One or more portions of wreckage 104a-104d may include hazardous materials.

The process may include establishing a command center 101 at aircraft crash site 100. Command center 101 may be constructed at the aircraft crash site 100, or command center 101 may be constructed prior to entering aircraft crash site 100. Command center 101 may be a mobile command center, such as a trailer mounted command center. For example and without limitation, command center 101 may include a building, warehouse, or trailer mounted structure, which may be provided with power for lighting and climate control. Command center 101 may be provided with communications systems, such as wired or wireless telephone connections, wired or wireless internet connections, or combinations thereof. In operation, command center 101 may provide a centralized location for managing aircraft retrieval and aircraft crash site 100 remediation.

The process may include establishing a perimeter 103 of aircraft crash site 100. Establishing perimeter 103 may include providing communication that access within perimeter 103 is restricted. For example and without limitation, providing communication that access within perimeter 103 is restricted may include posting signage 105 within or proximate to perimeter 103. Communication that access within perimeter 103 is restricted may deter unauthorized entry into perimeter 103, warn of security or surveillance within or proximate to perimeter 103, or combinations thereof. Communication that access within perimeter 103 is restricted may include text, which may be in English, a language that is local to the aircraft crash site 100 if different from English, or combinations thereof.

Establishing perimeter 103 may include providing a barrier 107 surrounding the area defined by perimeter 103. Barrier 107 may include one or more fences, walls, gates, doors, or combinations thereof. Establishing perimeter 103 may reduce or eliminate injury, theft, evidence tampering, destruction of property, or combinations thereof within perimeter 103.

Establishing perimeter 103 may include providing surveillance within or proximate to perimeter 103. For example and without limitation, providing surveillance may include providing surveillance cameras 109 within or proximate to perimeter 103. Providing surveillance within or proximate to perimeter 103 may include providing security guard patrols within or proximate to perimeter 103. For example, a security guard post 111 may be provided within or proximate to perimeter 103. Security guard patrols may provide surveillance within or proximate to perimeter 103 on a constant or continual basis during aircraft retrieval and aircraft crash site 100 remediation. Security guard patrols may reduce or eliminate video, photography, or combinations thereof of aircraft crash site 100 taken by unauthorized individuals, agencies, or combinations thereof.

The process may include establishing a staging area 106 for wreckage. Establishing staging area 106 may include designating an area for arrangement of located wreckage 104b. Staging area 106 may be located on aircraft crash site 100.

The process may include preventing contamination by hazardous materials of the environment within or proximate to the perimeter 103. Preventing contamination may include stopping any presently occurring leaks of hazardous material into the environment within or proximate to the perimeter 103. Preventing contamination may include reducing or eliminating risk of potential future leaks of hazardous material into the environment within or proximate to the perimeter 103. For example, preventing contamination may include providing a containment unit 108 for wreckage 104b at staging area 106. Containment unit 108 may be adapted to prevent the release of hazardous materials into the environment. The process may include moving contained wreckage 104b into containment unit 108 for containment therein. Containment unit 108 may be constructed at aircraft crash site 100, such as by a HAZWOPER 40 technician. As one skilled in the art would understand, a HAZWOPER 40 technician is a technician that is trained or certified under Hazardous Waste Operations and Emergency Response Standards (HAZWOPER) for a period of time, such as for 40 hours (HAZWOPER 40). As is understood by one skilled in the art, HAZWOPER is a set of guidelines produced and maintained by OSHA.

For example and without limitation, staging area 106 may include a warehouse, which may include one or more security devices, such as one or more locked doors. Staging area 106 may include a containment barrier 123. For example and without limitation, containment barrier 123 may be a privacy screening fence. Staging area 106 may include a covered area 121, which may prevent exposure of contained wreckage 104b to environmental factors, such as rain. For example and without limitation, covered area 121 may be a building, such as a warehouse, or a tent.

The process may include washing at least some wreckage 104c with a washing medium 110 in a decontamination unit 112. Decontamination unit 112 may be constructed at aircraft crash site 100. Washing medium 110 may include water, biodegradable degreasers, other cleaning agents, or combinations thereof. Washing wreckage 104c with washing medium 110 may include using a pressure washer, such as a HYDROBLASTER®, scrubbing wreckage, such as with hard bristled brooms, or combinations thereof. Wreckage 104c may be washed to remove dirt, paint, which may contain Chromium VI, other chemicals or compounds, or combinations thereof. Wreckage 104c may be washed to remove hazardous materials. Washing of wreckage 104c may be performed manually, such as by a HAZWOPER 40 technician.

The process may include transferring washing medium 110 from decontamination unit 112 to one or more tanks 117. Tanks 117 may be built to International Organization for Standardization (ISO) standards. Decontamination unit 112 may include a drain 113 adapted to allow washing medium 110 to leave decontamination unit 112. Conduit 115 may be in fluid communication with drain 113. For example and without limitation, conduit 115 may be a flexible pipe coupled to drain 113. Conduit 115 may be adapted to transfer washing medium 110 from drain 113 to tanks 117. In some embodiments, pump 119 may be in fluid communication with conduit 115. Pump 119 may be adapted to pump washing medium 110 from decontamination unit 112 into one or more tanks 117. Wreckage 104c may be moved to decontamination unit 112 and washed under direction of an NTSB official or another local, state, or federal government official, for example.

The process may include determining a waste profile of washing medium 110 after washing medium 110 is used to wash wreckage 104c. For example and without limitation, one or more samples of washing medium 110 may be taken from tanks 117. Samples of washing medium 110 may be analyzed, such as at a scientific laboratory, for analysis and determination of contents of washing medium 110. For example, washing medium 110 may be analyzed for the presence of hazardous materials that may be harmful to human health or the environment by analytical methods, such as chemical analysis, known to those skilled in the art. In certain embodiments, washing medium 110 may be sent to a commercial laboratory, such as ALS Environmental, for chemical analysis via methods known to those skilled in the art, including chromatography and/or spectrometry. For example and without limitation, washing medium 110 may be analyzed using gas chromatography, mass spectrometry, or both. A waste profile may be developed based upon analysis of samples of washing medium 110. The waste profile may list determined contents of washing medium 110. For example and without limitation, waste profile may list hazardous materials and the concentrations thereof. Depending upon the contents of washing medium 110 per the waste profile, washing medium 110 in tanks 117 may be sent to a transportation storage and disposal facility for disposal, an environmental landfill for disposal, or combinations thereof. For example and without limitation, if washing medium 110 is determined to have concentrations of hazardous materials that are too high for disposal in an environmental landfill in accordance with local, state, and federal laws and regulations, the washing medium 110 may be sent to a transportation storage and disposal facility adapted for disposal of hazardous materials.

In certain embodiments, the process includes separation of portions of wreckage from other portions of wreckage or from non-wreckage. Separation of wreckage may include sifting wreckage. In some embodiments, wreckage may be subjected to sifting using a sieve. For example and without limitation, wreckage that is a portion of aircraft may be sifted to separate wreckage from human remains, dirt, sand, or other debris. In certain embodiments, separation of portions of wreckage from other portions of wreckage or from non-wreckage is performed prior to washing wreckage.

The process may include monitoring air quality at aircraft crash site 100. For example and without limitation, one or more air monitors 116 may be provided within or proximate to perimeter 103. Air monitors 116 may be adapted to monitor air for the presence of chemicals or compounds that may be harmful to human health or the environment. For example, air monitors 116 may be adapted to monitor air for the presence of VOCs, mercury, radiation, or combinations thereof.

The process may include identifying and controlling hazardous materials at aircraft crash site 100, such as those that pose near term or immediate harm to human health, the environment, or combinations thereof. For example and without limitation, hazardous materials may include various hydrocarbons, such as benzene, toluene, and xylene isomers (BTX), oil range organics (ORO), diesel range organics (DRO), gasoline range organics (GRO); heavy metals, such as Chromium; radiation; or combinations thereof. Hazardous materials may include biohazards. Hazardous materials may include petroleum fuel, VOCs, polychlorinated biphenyls, asbestos, or combinations thereof. Hazardous materials may be identified and controlled by a technician, such as a HAZWOPER 40 technician. Hazardous materials may be identified by manual inspection, such as by visual inspection. Controlling identified hazardous materials may include packing, transporting, and disposing of identified hazardous materials in accordance with local, state, and federal laws and regulations related to the identified hazardous materials.

The process may include identifying hazardous materials that are non-essential to any ongoing investigation of aircraft crash site 100, such as a federal investigation of aircraft crash site 100 by an NTSB official. For example and without limitation, non-essential hazardous materials may include components of aircraft or cargo thereof including batteries, chemical oxygen generators, or other hazardous materials.

The process may include determining a hazardous waste profile for identified hazardous materials or identified potentially hazardous materials. Identified potentially hazardous materials may include soil, water, or both at or proximate aircraft crash site 100. In certain embodiments, the process includes sampling one or more portions of soil, water, or both at or proximate aircraft crash site 100. For example, core samples of soil from one or more portions of aircraft crash site 100 may be taken. The core samples of soil may be taken at various depths. The one or more samples may be tested for the presence of hazardous materials. For example and without limitation, the one or more samples may be sent to a scientific laboratory for analysis thereof. Hazardous waste profiles may be developed based upon the analysis of the one or more samples. The samples may be analyzed using chromatography, spectrometry, or combinations thereof, for example. In certain embodiments, the samples may be sent to a commercial laboratory, such as ALS Environmental, for chemical analysis via methods known to those skilled in the art, including chromatography and/or spectrometry. For example and without limitation, the presence of VOCs in the samples may be analyzed using gas chromatography/mass spectrometry (GC/MS) in accordance with EPA Method 8260B and/or 8260C. The samples may be analyzed using inductively coupled plasma-mass spectrometry, such as in accordance with EPA Method 6020A. The samples may be analyzed for Total Petroleum Hydrocarbons (TPH), such as in accordance with the Texas Commission on Environmental Quality (TCEQ) Method 1005. The presence of non-halogenated organics in the samples may be determined, such as by gas chromatography, which may be performed in accordance with EPA Method 8015C. Hazardous waste profiles may be determined in accordance with local, state and federal laws and regulations pertaining to identified hazardous materials. For example, hazardous waste profiles may include indications of the presences of hazardous materials and indications of concentrations of hazardous materials in the samples. For example and without limitation, hazardous waste may be identified and profiled by analytical methods, such as chemical analysis, known to those skilled in the art. Based upon hazardous waste profiles, identified hazardous materials may be packaged and transported to an appropriate transportation storage and disposal facility for disposal. For example and without limitation, hazardous materials may be packaged and transported in accordance with Department of Transportation HAZMAT regulations.

The process may include protecting the immediate and surrounding environment of aircraft crash site 100. For example, a water system (not depicted) at or proximate aircraft crash site 100 may be protected from contamination by wreckage 104a-104d or materials used in the process. Water system may include manmade or natural water systems, such as bayous, rivers, lakes, ponds, creeks, oceans, gutters, canals, fresh water systems, sewage systems, aquifers, irrigation systems, or combinations thereof. Protecting the immediate and surrounding environment may include deploying one or more drain containment spill berms 122. Drain containment spill berms 122 may protect the immediate and surrounding environment by preventing egress of solids or liquids at aircraft crash site 100 from entering the immediate and surrounding environment. While FIG. 1 depicts a single drain containment spill berm 122, one skilled in the art would understand that multiple drain containment spill berms 122 may be used. For example and without limitation, drain containment spill berms 122 may be deployed about an entirety of the perimeter 103 or less than an entirety of the perimeter 103. Protecting the immediate and surrounding environment may include deploying chemical dispersants to isolate or remediate hazardous materials at aircraft crash site 100. For example, chemical dispersants may include those used in oil spill cleanups, such as COREXIT® commercially available from NALCO. A technician, such as a HAZWOPER 40 technician, may oversee or perform protecting of immediate and surrounding environment.

The process may include packaging washed wreckage 104d in one or more containers 114. Containers 114 may be constructed at aircraft crash site 100. Decontaminated wreckage 104d may be placed in a designated staging area 125 for packing and shipping. For example and without limitation, wreckage 104d may be packaged in one or more containers 114 and shipped in accordance with the DOT HAZMAT regulations.

The process may include shipping packaged wreckage 104d, or allowing packaged wreckage 104d to be shipped. For example and without limitation, packaged wreckage 104d may be loaded onto a transportation structure, such as a truck or train, for shipping. The transportation structure may be adapted for transporting materials in accordance with DOT HAZMAT regulations. Wreckage 104d may be packaged and shipped in accordance with the standards of the Pipeline and Hazardous Materials Safety Administration (PHMSA) of the DOT. Packaging and shipping wreckage 104d may include obtaining one or more permits from PHMSA. Wreckage 104*d* may be transported to one or more facilities for storage, investigation, incineration, disposal, or combinations thereof.

Figure 8:
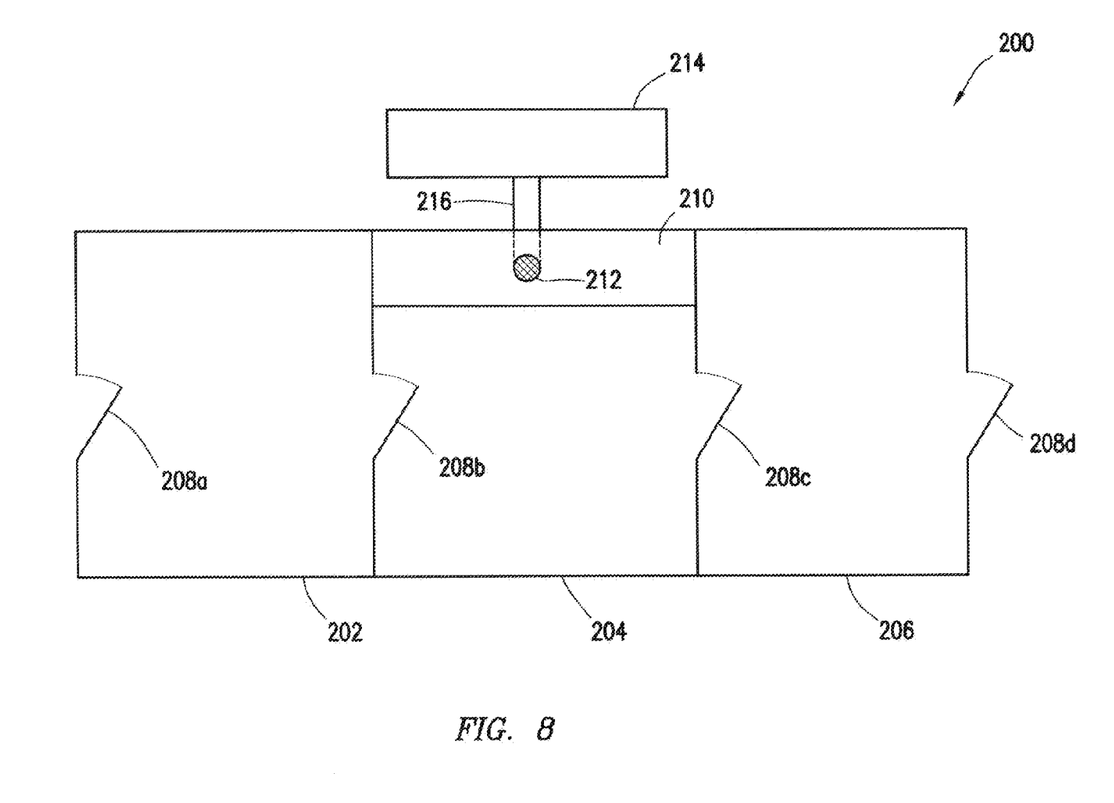
FIG. 8 depicts a personnel decontamination unit in accordance with one or more embodiments.

The process may include providing personnel decontamination unit 200 at or proximate aircraft crash site 100. Personnel decontamination unit may allow personnel working at or proximate aircraft crash site 100 to decontaminate prior to leaving aircraft crash site 100.

The process may include remediating land at aircraft crash site 100. Remediation of land may include testing soil at aircraft crash site 100 for the presence of hazardous materials as described above, or allowing the soil to be tested. For example, the samples may be analyzed using chromatography, spectrometry, or combinations thereof. In certain embodiments, the samples may be sent to a commercial laboratory, such as ALS Environmental, for chemical analysis via methods known to those skilled in the art, including chromatography and/or spectrometry. For example and without limitation, the samples may be analyzed using gas chromatography/mass spectrometry (GC/MS) in accordance with EPA Method 8260B and/or 8260C, inductively coupled plasma-mass spectrometry in accordance with EPA Method 6020A, and/or gas chromatography in accordance with EPA Method 8015C, as described above. The samples may be analyzed for TPH, such as in accordance with TCEQ Method 1005. For example and without limitation, a core sample of soil may be taken and analyzed for the presence of hazardous materials by analytical methods, such as chemical analysis, known to those skilled in the art. Soil that is contaminated with hazardous materials may be removed for storage, investigation, incineration, disposal, or combinations thereof. New soil or materials may be provided at aircraft crash site 100 in place of removed soil. After remediating land at aircraft crash site 100, one or more samples of soil, water or both at or proximate aircraft crash site 100 may be tested again for the presence of hazardous materials, such as to ensure that hazardous materials are no longer present in the soil, water or both. If hazardous materials are determined to be present, contaminated soil may again be removed for storage, investigation, incineration, disposal, or combinations thereof, and new soil or materials may again be provided at aircraft crash site 100 in place of removed soil. Removal and replacement of contaminated soil, water, or both may be repeated until samples of the soil, water, or both are determined to be free of hazardous materials in accordance with local, state, and federal laws and regulations. As used herein, "free of hazardous materials" means that the hazardous materials are present at a level that is at or below the maximum allowed concentration of the hazardous materials in accordance with local, state, and federal laws and regulations. As is understood by one skilled in the art, the maximum allowed concentration of hazardous materials varies depending upon the particular hazardous material, as well as the particular local, state, and federal laws or regulations applicable to the aircraft crash site 100.

The process may include selling or assisting in the selling of one or more portions of wreckage 104*a*-104*d*. The process may include scrapping or assisting in the scrapping of one or more portions of wreckage 104*a*-104*d*. Scrapping may include shredding and milling wreckage 104*a*-104*d*. The process may include repurposing or assisting in the repurposing of one or more portions of wreckage 104*a*-104*d*, such as by recycling wreckage 104*a*-104*d*.

The process may include implementing a full document-retention program to track and verify stages of inspection, verification, and sales process of one or more portions of wreckage 104*a*-104*d*. For example and without limitation, wreckage 104*a*-104*d* may be monitored continuously or continually throughout the process. Wreckage 104*a*-104*d* may be monitored using video monitoring, photographic monitoring, or combinations thereof. Wreckage 104*a*-104*d* may be monitored from a time at or after access of aircraft crash site 100 until wreckage 104*a*-104*d* is disposed of or repurposed. Wreckage 104*a*-104*d* may be monitored during storage after transport from aircraft crash site. Monitoring wreckage 104*a*-104*d* may assist in establishing integrity of any evidence associated with crash of aircraft, such as for any ongoing investigation conducted by the NTSB.

The process may include using tracking technology, such as radio-frequency identification (RFID), to track one or more portions of wreckage 104*a*-104*d*. Tracking equipment, such as RFID tags, may be coupled with one or more portions of wreckage 104*a*-104*d*. As understood by those skilled in the art, signals from RFID tags may be remotely tracked. Wreckage 104*a*-104*d* may be tracked beginning at any point in the process after access of the aircraft crash site 100, and ending at any time thereafter, such as upon sale of wreckage 104*a*-104*d*, scrapping of wreckage 104*a*-104*d*, or combinations thereof. For example and without limitation, wreckage 104*a*-104*d* may be tracked during aircraft retrieval and aircraft crash site 100 remediation, during shipping of wreckage 104*a*-104*d*, during storage of wreckage 104*a*-104*d*, during sale of wreckage 104*a*-104*d*, or combinations thereof.

The process may include optimization of real estate value through sale or re-development of the land at the aircraft crash site 100, or assisting in optimization of real estate value through sale or re-development of the land at the aircraft crash site 100. Optimization of real estate value may include ensuring land at aircraft crash site 100 is at least as valuable as prior to crash of aircraft, such as by replacing contaminated portion of land with new soil or other materials.

FIGS. 2A-2D depict containment unit 108 and portions thereof in accordance with one or more embodiments. Wreckage may be stored in containment space 135 of containment unit 108, such as after locating wreckage but prior to washing wreckage.

Figures 2A, 2B, 2C, 2D:
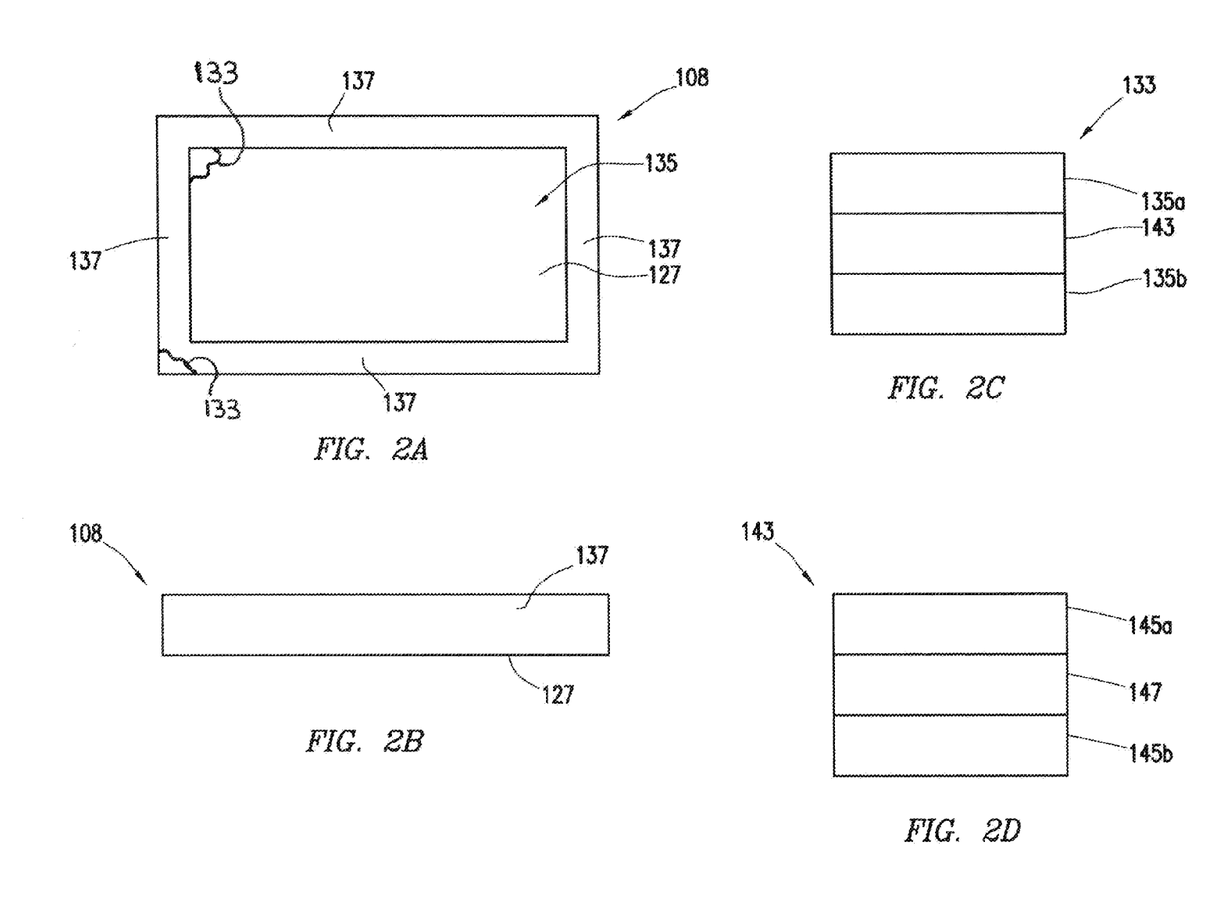
FIG. 2A depicts a top view of a containment unit in accordance with one or more embodiments.
FIG. 2B depicts a side view of a containment unit in accordance with one or more embodiments.
FIG. 2C depicts material layers of a component of a containment unit in accordance with one or more embodiments.
FIG. 2D depicts a cushion layer of a containment unit in accordance with one or more embodiments.

Containment unit 108 may be constructed at aircraft crash site, such as by a HAZWOPER 40 technician. Containment unit 108 may include a base 127. Base 127 may be of modular construction. Base 127 may be constructed of one or more sheets coupled together, such as sheets of plywood coupled with runners. Base 127 may be constructed at aircraft crash site. In operation, a modular embodiment of base 127 may be constructed at the staging area for located wreckage. Base 127 constructed at the staging area may be sized and shaped to contain wreckage. Base 127 may be formed of one or more materials suitable for support of wreckage. For example and without limitation, base 127 may be formed of timber members, composite timber members, or combinations thereof.

Containment unit 108 may include one or more sidewalls 137. Sidewalls 137 may be coupled to base 127. Sidewalls 137 may be coupled with base 127 at or around an edge of base 127. For example and without limitation, sidewalls 137 may include timber members, composite timber members, or combinations thereof. Each sidewall 137 may be coupled to one or more adjacent sidewalls 137, such as by fastening. Sidewalls 137 may extend from base 127, forming containment space 135. Base 127 and sidewalls 137 may be constructed of wood, metal, composite timber, or another structurally rigid material.

One or more portions of containment unit 108 may include one or more coverings 133 draped there-over, laminated thereon, or otherwise coupled thereto. For example and without limitation, covering 133 may be adapted to retain hazardous materials within containment unit 108, provide impact damping, or combinations thereof. Covering 133 may include one or more retention layers 135a and 135b. Retention layers 135a and 135b may be formed of a material that is impermeable or substantially impermeable to water, oil, aircraft fuel, other liquids, particulates, or combinations thereof. Retention layers 135a and 135b may be formed of a material that is impermeable or substantially impermeable to hazardous materials. Retention layers 135a and 135b may be formed of polypropylene sheeting or other polymeric sheeting. Retention layers 135a and 135b may have a thickness ranging from about 2 mil to about 20 mil, 5 mil to about 15 mil, or 7 mil to about 12 mil, such as about 10 mil. One or more retention layers 135a and 135b may be coupled with one or more portions of base 127, one or more portions of sidewalls 137, or combinations thereof.

Containment unit 108 may include one or more cushion layers 143. Cushion layer 143 may be disposed over base 127, sidewalls 137, or combinations thereof. For example and without limitation, cushion layer 143 may form a contiguous layer over base 127 and sidewalls 137. Cushion layer 143 may be disposed over one or more retention layers 135a and 135b. For example, FIG. 2C depicts cushion layer 143 disposed over retention layer 135b and under retention layer 135a. One skilled in the art with the aid of this disclosure would understand that the number and arrangement of layers of covering 133 may be varied, and covering 133 is not limited to the specific embodiment depicted in FIG. 2C. Cushion layer 143 may be adapted to provide impact damping to base 127, sidewalls 137, or combinations thereof. For example and without limitation, when wreckage is inserted into containment unit 108, cushion layer 143 may provide damping of the impact of wreckage with one or more portions of containment unit 108. Cushion layer 143 may include one or more impact damping layers 145a and 145b, as depicted in FIG. 2D. Impact damping layers 145a and 145b may be adapted to provide damping of the impact of wreckage with one or more portions of containment unit 108. For example and without limitation, impact damping layers 145a and 145b may be formed of a felt material. Cushion layer 143 may include one or more elastically deformable rigid layers 147. Elastically deformable rigid layer 147 may be adapted to elastically deform upon impact of wreckage with containment unit 108. Elastically deformable rigid layer 147 may be adapted to spread force of impacts with containment unit 108 over a surface area that is larger than a surface area of the originating impact. Elastically deformable rigid layer 147 may be formed of plastic, metal, plastic coated metal, or combinations thereof. For example and without limitation, elastically deformable rigid layer 147 may be formed of a chain link material, such as chain link steel sheet, that may be coated, such as with a polymeric coating. Cushion layer 143 may include one or more elastically deformable rigid layers 147 arranged adjacent to or between one or more impact damping layers 145a and 145b. Cushion layer 143 may be coupled to base 127, sidewalls 137, retention layers 135a and 135b, or combinations thereof. One skilled in the art with the aid of this disclosure would understand that the number and arrangement of layers in cushion layer 143 may be varied, and cushion layer 143 is not limited to the specific embodiment depicted din FIG. 2D.

In certain embodiments, the uppermost layer of covering 133, such as retention layer 135a, may have a thickness ranging from about 40 mil to about 150 mil, 60 mil to about 130 mil, or 80 mil to about 110 mil, such as about 100 mil. The thicker uppermost layer of covering 133 may provide additional protection from impact with wreckage, reducing tearing of covering 133.

Containment unit 108 may be adapted to prevent the release of hazardous materials into the environment, such as in accordance with local, state and federal laws and regulations. For example and without limitation, wreckage may be arranged within containment space 135 formed by base 127 and sidewalls 137, as depicted in FIG. 2A. Sidewalls 137 and base 127 may contain one or more portions of wreckage. One or more coverings 133 may provide containment of liquid wreckage, particulate wreckage, or combinations thereof within containment space 135 formed by base 127 and sidewalls 137.

Figures 3A, 3B, 3C:
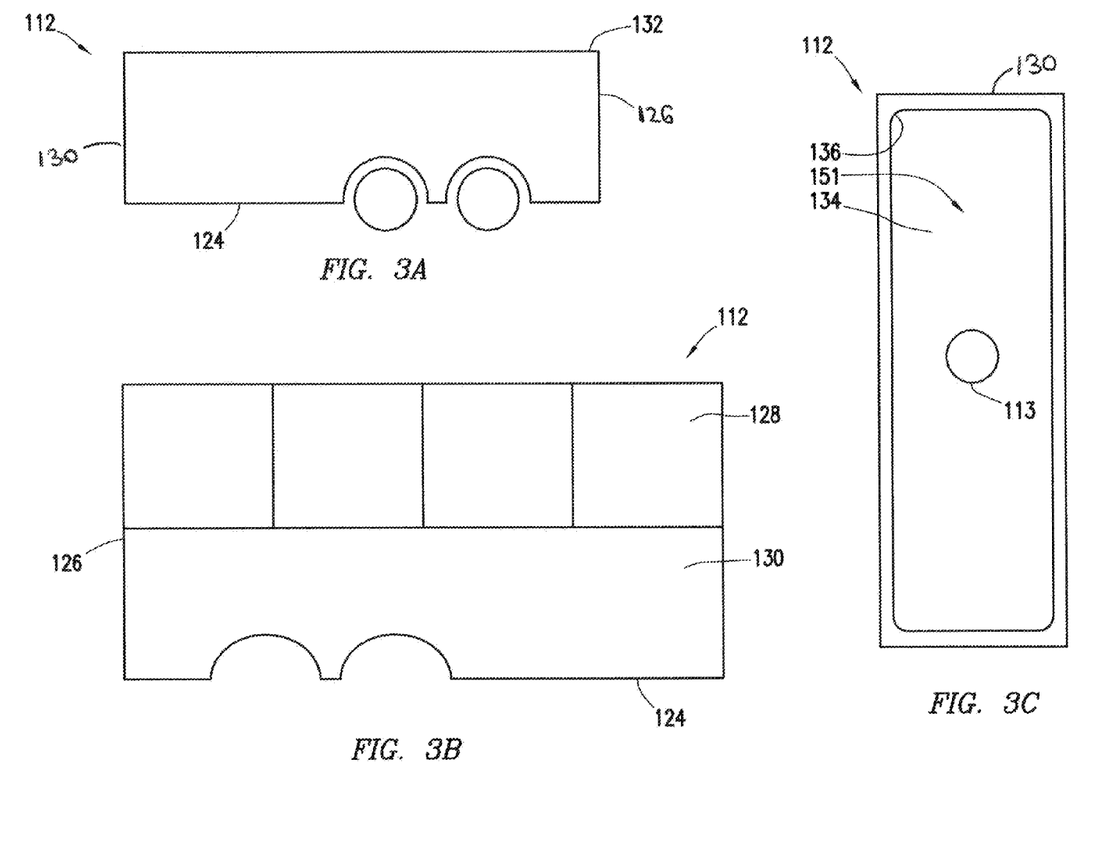
FIG. 3A depicts a side view of a decontamination unit in accordance with one or more embodiments.
FIG. 3B depicts a side view of a decontamination unit in accordance with one or more embodiments.
FIG. 3C depicts a top view of a decontamination unit in accordance with one or more embodiments.

FIG. 3A depicts decontamination unit 112 in accordance with one or more embodiments. Decontamination unit 112 may be a mobile decontamination unit. For example and without limitation, decontamination unit 112 may be mounted on a trailer 124. Trailer 124 may be adapted to couple with a truck for transportation of decontamination unit 112. In some embodiments, decontamination unit 112 may include an intermodal ISO container.

Washing of wreckage may be performed within decontamination unit 112 for decontamination thereof.

Decontamination unit 112 may include door 126. For example and without limitation, a housing of decontamination unit 112 may be an enclosed trailer, such as a trailer of a semi-trailer truck. Door 126 may be adapted to allow movement of wreckage into and out of decontamination unit 112. Door 126 may be adapted to be watertight to prevent washing medium from escaping decontamination unit 112. For example, coupling of door 126 to one or more walls 130 of decontamination unit 112 may include watertight sealing. When door 126 is closed, a watertight cavity or basin 151 may be formed in decontamination unit 112, within which wreckage may be washed.

As depicted in FIG. 3B, decontamination unit 112 may include one or more removable sides 128. Removable sides 128 may be adapted to prevent washing medium from escaping decontamination unit 112. For example and without limitation, coupling of removable sides 128 to one or more walls 130 of decontamination unit 112 may include watertight sealing. Removable sides 128 may be removed from walls 130, allowing wreckage to be inserted into or removed from decontamination unit 112. In one or more embodiments, removable sides 128 may be coupled to walls 130 by fastening. Removable walls 128 may be rigid or flexible. In embodiments in which removable walls 128 are flexible, removable walls 128 may be curtains, for example.

In the top view of decontamination unit 112 depicted in FIG. 3C, top 132 of decontamination unit 112 is removed such that an interior of decontamination unit 112 is viewable. Decontamination unit 112 may include a bottom surface 134. Bottom surface 134 may include a coating adapted to retain washing medium in the decontamination unit 112. For example and without limitation, coating may be a gunite type coating. Bottom surface 134 may include one or more rounded corners 136 adapted to retain washing medium in the decontamination unit 112. Drain 113 may be formed in bottom surface 134. Drain 113 may, as previously discussed, be adapted to purge washing medium from decontamination unit 112. Bottom surface 134 may be graded to allow washing medium to flow to drain 113.

Figure 4:
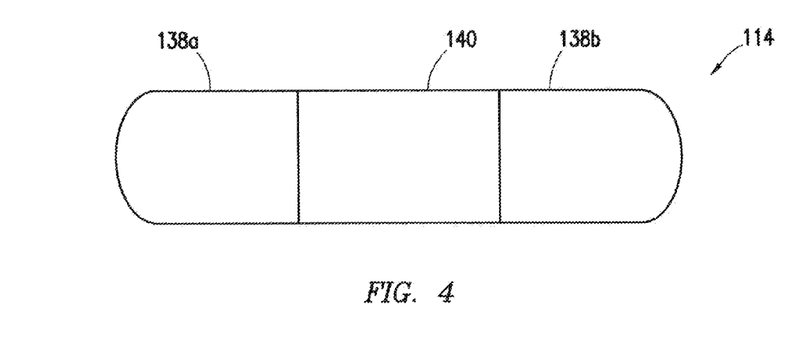
FIG. 4 depicts a side view of a container in accordance with one or more embodiments.

FIGS. 4, 5A-5E, 6A-6C, 7A and 7B depict container 114 in accordance with one or more embodiments. As depicted in FIG. 4, container 114 may be a modular container including end caps 138a and 138b at each end, and one or more intermediate portions 140. Container 114 may be adapted for packing wreckage, such as for shipping of wreckage. In operation, in accordance with one or more embodiments, end cap 138a may be adapted to be coupled to intermediate portion 140, and end cap 138b may be adapted to be coupled to intermediate portion 140 opposite end cap 138a. Although FIG. 4 depicts a single intermediate portion 140 between end cap 138a and end cap 138b, embodiments of container 114 may include multiple intermediate portions 140 between end cap 138a and end cap 138b. In embodiments with multiple intermediate portions 140, end cap 138a may be coupled to a first intermediate portion, and end cap 138b may be coupled to a second intermediate portion. In some embodiments, one or more additional intermediate portions may be coupled between the first and second intermediate portions. A length of container 114 may be modulated by selection of the number of intermediate portions 140 coupled between end cap 138a and end cap 138b. In some embodiments, container 114 may include end cap 138a coupled with end cap 138b without any intermediate portions coupled between end cap 138a and end cap 138b. Container 114 may be constructed of steel, for example.

As depicted in FIGS. 5A-5E and 6A-6C intermediate portion 140 may include flanges 146. Flanges 146 may be adapted to couple with connection end 148 of end cap 138. In some embodiments, a seal (not shown), such as a gasket, may be disposed adjacent flanges 146. The seal may provide a sealed coupling between end cap 138 and intermediate portion 140. In embodiments of container without intermediate portions, end cap 138 may include flanges and seal for coupling with another end cap. End cap 138 may be secured with intermediate portion 140 or another end cap, such as via fastening, welding, or combinations thereof. Fastening may include bolting, for example.

Figure 5A:
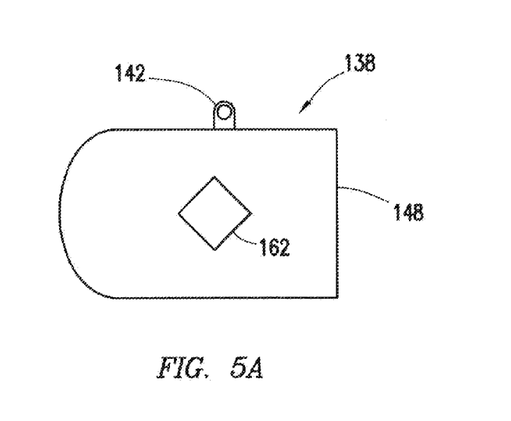
FIG. 5A depicts a side view of an end cap of a container in accordance with one or more embodiments.
Figure 5B:
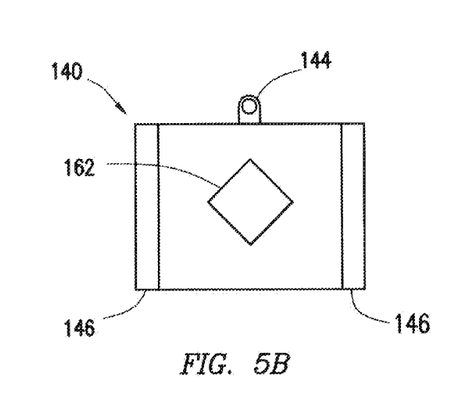
FIG. 5B depicts a side view of an intermediate portion of a container in accordance with one or more embodiments.

End cap 138 may include one or more lifting eyes 142. Intermediate portion 140 may include one or more lifting eyes 144. Lifting eyes 142 and 144 may, for example and without limitation, allow container 114 or portions of container 114 to be lifted and moved, such as with a crane.

Figure 5C:
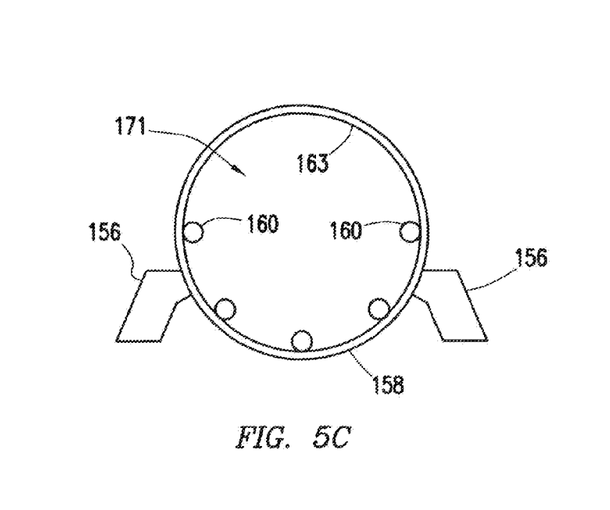
FIG. 5C depicts a front cut view of a portion of a container in accordance with one or more embodiments.
Figure 5D:
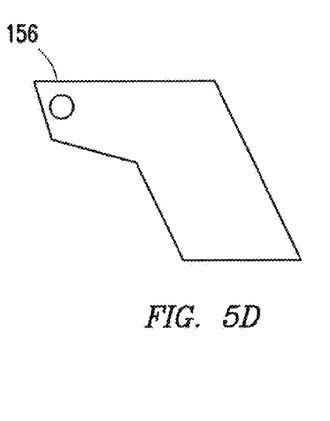
FIG. 5D depicts a side view of a container foot in accordance with one or more embodiments.
Figure 5E:
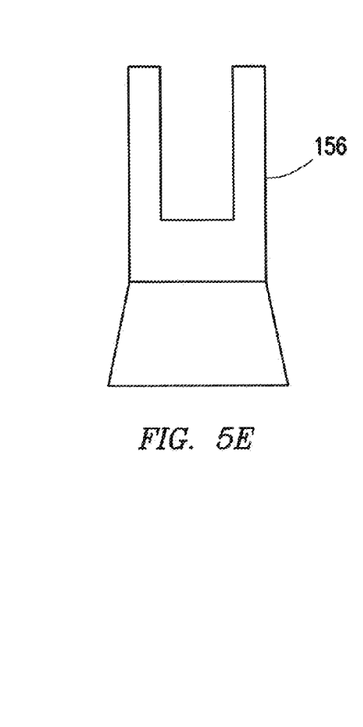
FIG. 5E depicts a top view of a container foot in accordance with one or more embodiments.

Container 114 may include one or more feet 156, which may provide stability during shipping of container 114, for example. As depicted in FIG. 5C, container 114 may have a round-bottom 158. Feet 156 may allow container 114 with round-bottom 158 to stably rest on a surface, such as a trailer surface for transport.

Container 114 may include one or more roller tracks 160 on an internal surface 163 thereof. Roller tracks 160 may be adapted to allow wreckage to be inserted into container 114. For example, wreckage may slide along roller tracks 160 as wreckage is inserted into container 114.

Container 114 may include one or more DOT placard holders 162, allowing container 114 to be shipped in compliance with laws and DOT regulations.

Each end cap 138 and intermediate portion 140 may be generally hollow, forming a cavity 171 for receipt of and containment of wreckage. In operation, in one or more embodiments, packaging wreckage into container 114 may include inserting wreckage into cavity 171 of one or more portions of container 114, such as into a first end cap, or into a first end cap coupled with one or more intermediate portions. After wreckage is inserted into one or more portions of container 114, remaining portions of container 114 may be coupled thereto. For example and without limitation, a second end cap may be coupled to intermediate portion, thus enclosing wreckage within container 114.

Figure 6A:
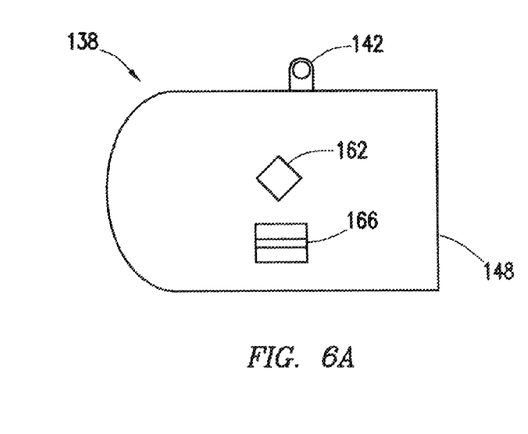
FIG. 6A depicts a side view of an end cap of a container in accordance with one or more embodiments.
Figure 6B:
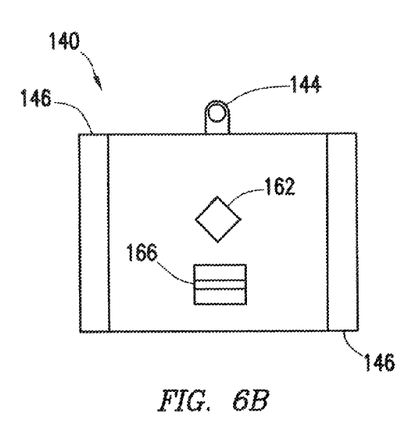
FIG. 6B depicts a side view of an intermediate portion of a container in accordance with one or more embodiments.
Figure 6C:
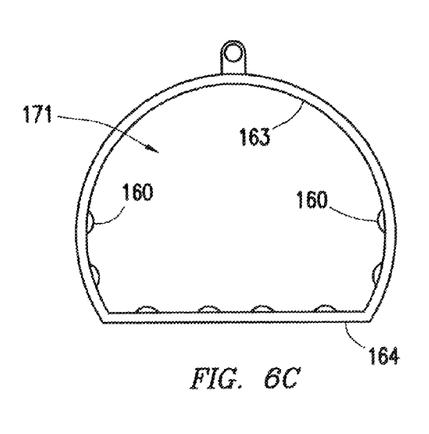
FIG. 6C depicts a front cut view of a portion of a container in accordance with one or more embodiments.

As depicted in FIGS. 6A-6C, container 114 may have a flat bottom 164. Flat bottom 164 may provide stability during shipping of container 114. For example, flat bottom 164 may allow container 114 to stably rest on a surface, such as a trailer surface for transport.

In some embodiments, container 114 may be adapted to be coupled with a transportation structure, such as a trailer of a truck, a railcar of a train, or both. Container 114 may include one or more tie downs 166. Tie downs 166 may be adapted for attaching container 114 to a transportation structure, such as for shipping. For example and without limitation, strapping may be coupled to tie downs 166 and to a transportation structure to secure container 114 to the transportation structure.

Figure 7A:
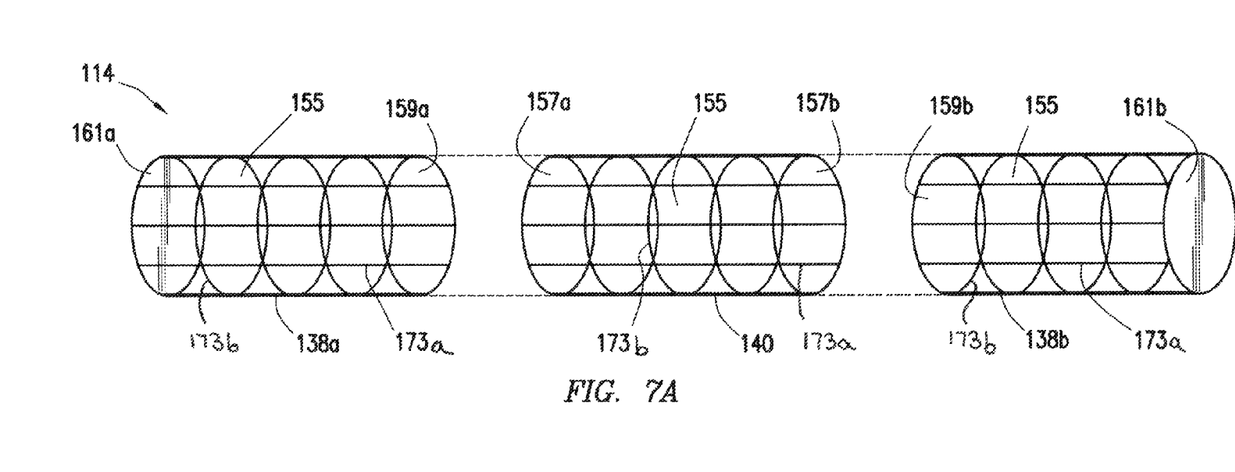
FIG. 7A depicts an exploded view of a container in accordance with one or more embodiments.
Figure 7B:
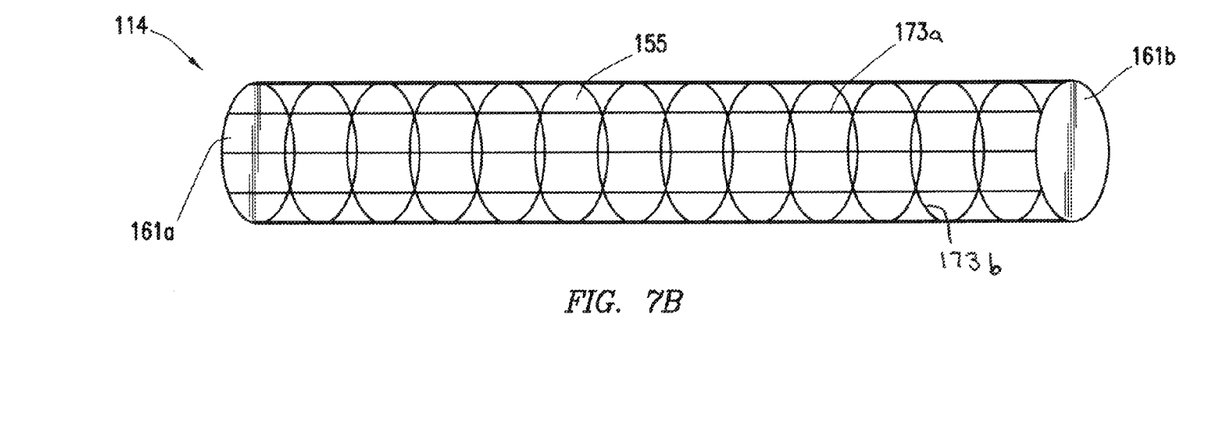
FIG. 7B depicts the container of FIG. 7A in accordance with one or more embodiments.

FIGS. 7A and 7B depict container 114 in accordance with one or more embodiments. Container 114 may have one or more openings 155. Container 114 may have a plurality of openings 155, forming a cage structure. Openings 155 may provide fluid communication between the external environment and the cavity of container 114. Container 114 with openings 155 may be used for transport of explosive materials, such as wreckage that includes explosive materials. In the occurrence of an explosion of contents of container 114, openings 155 may allow the pressure of explosion to communicate there-though, and reduce the exertion of the pressure on container 114. Container 114 with openings 155 may be modular and include end caps 138a and 138b and intermediate portion 140. Intermediate portion 140 may include opened ends 157a and 157b. End cap 138a may include an opened end 159a and a closed end 161a. End cap 138b may include an opened end 159b and a closed end 161b. Closed ends 161a and 161b may be solid. For example and without limitation, closed ends 161a and 161b may be solid steel plates. End cap 138a may be coupled with central portion 140 such that opened end 159a couples to opened end 157a. End cap 138b may be coupled with central portion 140 such that opened end 159b couples to opened end 157b. Coupling of end caps 138a and 138b with intermediate portion 140 may performed via fastening, such as bolting, or welding, or both, for example. In some embodiments, container 114 may be formed of steel tube stock connected with cylindrical or disc shaped steel plates. For example and without limitation, closed ends 161a and 161b may be formed of solid steel discs. Opened ends 159a, 159b, 157a, and 157b may be formed of steel rings or plates with holes formed there-through. In some embodiments, a cage structure may form an external wall of container 114 between closed ends 161a and 161b. As depicted in FIGS. 7A and 7B, cage structure may be formed of multiple members 173a extending parallel to a longitudinal axis of container 114 and multiple members 173b extending circumferentially about the axis of container 114. Members 173a and 173b of cage structure may be formed of tubular stock, for example, which may be coupled to closed ends 161a and 161b, and opened ends 159a, 159b, 157a, and 157b, such as via welding, bolting, or both. Tubular stock may be square, round, or any other shape. As depicted in FIGS. 7A and 7B, members 173a intersect with members 173b. Members 173a may be coupled with members 173b at the intersections thereof, such as via ties, bolting, or welding, for example. While not depicted in FIGS. 7A and 7B, container 114 having the cage structure may include one or more tie downs, one or more DOT placards, one or more lifting eyes, or combinations thereof, as discussed above.

FIG. 8 depicts personnel decontamination unit 200. Personnel decontamination unit 200 may include one or more contaminated rooms 202, one or more wash rooms 204, and one or more clean rooms 206. Personnel decontamination unit 200 may allow personnel working at or proximate aircraft crash site to decontaminate prior to leaving aircraft crash site. For example, in operation personnel may enter into contaminated room 202, such as through door 208a. Personnel may remove articles of clothing in contaminated room 202, such as PPE. Personnel may then enter wash room 204, such as through door 208b. Personnel may undergo decontamination in wash room 204, such as in shower 210. Shower 210 may include a drain 212, which may be in fluid communication with one or more tanks 214, such as via a conduit 216. Tank 214 may be an ISO tank, for example. After decontamination in wash room 204, personnel may enter clean room 206, such as through door 208c. In clean room 206 personnel may put on clean articles of clothing and exit through door 208d. Used water in tanks 214 may be processed and analyzed in the same manner as washing medium 110, as discussed with reference to FIG. 1 above. For example, as waste profile of used water in tanks 214 may be obtained, and the used water in tanks 214 may be sent to transportation storage and disposal facility for disposal, an environmental landfill for disposal, or combinations thereof, based on the waste profile.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A process comprising:
   establishing a perimeter at an aircraft crash site;
   preventing contamination by hazardous materials of an environment within or proximate to the perimeter, wherein preventing contamination comprises containing wreckage in a containment unit that is adapted to prevent release of hazardous materials into the environment, wherein the wreckage comprises wreckage of an aircraft from the aircraft crash site;
   washing at least some of the wreckage in a decontamination unit; and
   packaging the washed wreckage in a container.

2. The process of claim 1, further comprising, prior to containing the wreckage, locating the wreckage at the aircraft crash site.

3. The process of claim 2, further comprising, prior to locating the wreckage, reviewing a cargo manifest of the aircraft to determine the absence or presence of hazardous materials on the aircraft.

4. The process of claim 1, further comprising reviewing and determining required licenses and regulatory requirements for aircraft retrieval and aircraft crash site remediation at the aircraft crash site.

5. The process of claim 1, further comprising, prior to accessing the aircraft crash site, locating an owner of land corresponding to at least a portion of the aircraft crash site and obtaining permission from the owner to access the land, clean the land, alter the land, or combinations thereof.

6. The process of claim 1, further comprising establishing a command center at the aircraft crash site and managing aircraft retrieval and aircraft crash site remediation from the command center.

7. The process of claim 1, wherein establishing the perimeter comprises: providing communication that access within perimeter is restricted; providing a barrier surrounding the area defined by the perimeter; providing surveillance within or proximate to the perimeter; or combinations thereof.

8. The process of claim 1, wherein washing at least some of the wreckage in the decontamination unit comprises:
   washing at least some of the wreckage with a washing medium;
   transferring the used washing medium from the decontamination unit to one or more tanks; and
   determining a waste profile of the used washing medium, and based on the waste profile, sending the used washing medium to a transportation storage and disposal facility for disposal, an environmental landfill for disposal, or combinations thereof.

9. The process of claim 1, further comprising monitoring air quality at the aircraft crash site.

10. The process of claim 1, further comprising:
    identifying hazardous materials or potentially hazardous waste materials at the aircraft crash site;
    determining a hazardous waste profile for the identified hazardous materials or identified potentially hazardous materials; and
    packing, transporting, disposing of, or combinations thereof the identified hazardous materials or identified potentially hazardous materials based upon the hazardous waste profile.

11. The process of claim 1, further comprising protecting an immediate and surrounding environment of the aircraft crash site.

12. The process of claim 11, wherein protecting the immediate and surrounding environment of the aircraft crash site comprises deploying one or more drain containment spill berms, deploying chemical dispersants, or combinations thereof.

13. The process of claim 1, further comprising, after packaging the washed wreckage, shipping the washed wreckage or allowing the washed wreckage to be shipped.

14. The process of claim 1, further comprising providing a personnel decontamination unit at or proximate the aircraft crash site, wherein the personnel decontamination unit is adapted to allow personnel working at or proximate the aircraft crash site to be decontaminated.

15. The process of claim 1, further comprising remediating land at the aircraft crash site, wherein remediating the land at the aircraft crash site comprises testing soil at the aircraft crash site for the presence of hazardous materials, or allowing the soil to be tested for the presence of hazardous materials; and if the soil is contaminated with hazardous materials, removing contaminated soil from the aircraft crash site.

16. The process of claim 1, further comprising monitoring the wreckage continuously or continually throughout the process using video monitoring, photographic monitoring, radio-frequency identification, or combinations thereof.

17. The process of claim 1, wherein the containment unit comprises:
    a base;

one or more sidewalls coupled to the base; and one or more coverings coupled to the base, the one or more sidewalls, or combinations thereof, wherein the one or more coverings comprise one or more retention layers adapted to retain hazardous materials within the containment unit and one or more cushion layers adapted to provide impact damping to the containment unit.

18. The process of claim 1, wherein the decontamination unit comprises a cavity or basin, a drain adapted to allow the washing medium to leave the cavity or basin, and one or more tanks in fluid communication with the drain, wherein the one or more tanks are adapted to receive the washing medium.

19. The process of claim 1, wherein the container comprises a first end cap and a second end cap, wherein the first end cap is adapted to be coupled to the second end cap, and wherein the packaging of the wreckage into the container comprises:

inserting the wreckage into the first end cap; and coupling the second end cap to the first end cap, wherein the container is adapted to be coupled with a transportation structure.

20. The process of claim 1, wherein the container comprises one or more openings in fluid communication with the external environment.

21. The process of claim 20, wherein a cage structure forms external walls of the container.

22. The process of claim 1, wherein the container comprises a first end cap, a second end cap, and one or more intermediate portions, wherein the container is adapted to be coupled to one of the one or more intermediate portions and the second end cap is adapted to be coupled to one of the one or more intermediate portions opposite the first end cap, and wherein the packaging of the wreckage into the container comprises:

inserting the wreckage into the first end cap coupled with one of the one or more intermediate portions; and coupling the second end cap to one of the one or more intermediate portions opposite the first end cap, wherein the container is adapted to be coupled with a transportation structure.

23. The process of claim 1, further comprising, prior to washing at least some of the wreckage in the decontamination unit, separating portions of wreckage from other portions of wreckage or from non-wreckage.

24. The process of claim 23, wherein separation of the wreckage from other portions of the wreckage or from the non-wreckage comprises sifting the wreckage.

25. A process comprising:

establishing a perimeter at an aircraft crash site;

locating wreckage at the aircraft crash site, wherein the wreckage comprises wreckage of an aircraft;

identifying hazardous materials or potentially hazardous waste materials at the aircraft crash site;

preventing contamination by the hazardous materials of an environment within or proximate to the perimeter;

determining a hazardous waste profile for the identified hazardous materials or identified potentially hazardous materials;

packing, transporting, disposing of, or combinations thereof the identified hazardous materials based upon the hazardous waste profile;

washing at least some of the wreckage;

determining a waste profile of washing medium that has been used to wash at least some of the wreckage and, based on the waste profile, sending the used washing medium to a transportation storage and disposal facility for disposal, an environmental landfill for disposal, or combinations thereof;

packaging at least some of the washed wreckage; and shipping at least some of the packaged wreckage or allowing at least some of the packaged wreckage to be shipped.

* * * * *